United States Patent
Volponi et al.

(10) Patent No.: US 7,277,838 B2
(45) Date of Patent: Oct. 2, 2007

(54) BOOTSTRAP DATA METHODOLOGY FOR SEQUENTIAL HYBRID MODEL BUILDING

(75) Inventors: Allan J. Volponi, West Simsbury, CT (US); Thomas Brotherton, Poway, CA (US)

(73) Assignee: United Technologies Corporation, Hartford, CT (US)

(*) Notice: Subject to any disclaimer, the term of this patent is extended or adjusted under 35 U.S.C. 154(b) by 516 days.

(21) Appl. No.: 10/926,760

(22) Filed: Aug. 26, 2004

(65) Prior Publication Data

US 2006/0047487 A1 Mar. 2, 2006

(51) Int. Cl.
G06G 7/48 (2006.01)

(52) U.S. Cl. .............. 703/7; 703/2; 703/16; 701/100; 702/185

(58) Field of Classification Search .............. 703/2, 703/6, 7; 702/184, 189, 185; 701/100
See application file for complete search history.

(56) References Cited

U.S. PATENT DOCUMENTS

| | | | | |
|---|---|---|---|---|
| 3,750,465 | A * | 8/1973 | Howell et al. ............ 73/117.3 |
| 5,210,704 | A | 5/1993 | Husseiny |
| 5,452,207 | A * | 9/1995 | Hrovat et al. .................. 701/1 |
| 6,721,770 | B1 | 4/2004 | Morton et al. |
| 6,823,253 | B2 * | 11/2004 | Brunell ....................... 701/100 |
| 6,823,675 | B2 * | 11/2004 | Brunell et al. ................ 60/773 |
| 7,020,595 | B1 * | 3/2006 | Adibhatla et al. ............. 703/7 |
| 7,027,953 | B2 * | 4/2006 | Klein .......................... 702/184 |
| 7,216,071 | B2 * | 5/2007 | Volponi ......................... 703/7 |
| 2003/0200069 | A1 | 10/2003 | Volponi |
| 2004/0123600 | A1 * | 7/2004 | Brunell et al. ................ 60/773 |
| 2005/0209767 | A1 * | 9/2005 | Kim et al. .................. 701/100 |
| 2005/0228619 | A1 * | 10/2005 | Burnet et al. ............... 702/189 |
| 2005/0288901 | A1 * | 12/2005 | Mylaraswamy et al. .... 702/185 |

OTHER PUBLICATIONS

"eSTORM: Enhanced Self Tuning On-board Real-time Engine Model", Brotherton et al, Proceedings 2003 Aerospace Conference, IEEE Mar. 2003.*
"Using neural networks to optimize gas turbine aero engines", Dodd et al, Computing & control Engineering Journal, pp. 129-135, Jun. 1997.*
"A Bootstrap Data Methodology for Sequential Hybrid Engine Model Building", Volponi, IEEE Aerospace Conference 2005, Mar. 2005.*
European Search Report for EP Patent Application No. 05018627.9, Apr. 25, 2006.

* cited by examiner

*Primary Examiner*—Fred Ferris
(74) *Attorney, Agent, or Firm*—Bachman & LaPointe, P.C.

(57) ABSTRACT

A method for modeling engine operation comprising the steps of: 1. collecting a first plurality of sensory data, 2. partitioning a flight envelope into a plurality of sub-regions, 3. assigning the first plurality of sensory data into the plurality of sub-regions, 4. generating an empirical model of at least one of the plurality of sub-regions, 5. generating a statistical summary model for at least one of the plurality of sub-regions, 6. collecting an additional plurality of sensory data, 7. partitioning the second plurality of sensory data into the plurality of sub-regions, 8. generating a plurality of pseudo-data using the empirical model, and 9. concatenating the plurality of pseudo-data and the additional plurality of sensory data to generate an updated empirical model and an updated statistical summary model for at least one of the plurality of sub-regions.

14 Claims, 5 Drawing Sheets

US 7,277,838 B2

BOOTSTRAP DATA METHODOLOGY FOR SEQUENTIAL HYBRID MODEL BUILDING

U.S. GOVERNMENT RIGHTS

The invention was made with U.S. Government support under contract NAS4-02038 awarded by NASA. The U.S. Government has certain rights in the invention.

BACKGROUND OF THE INVENTION (1) Field of the Invention

The present invention relates to a method, and an apparatus for performing such method, for sequentially building a hybrid model.

(2) Description of Related Art

A practical consideration for implementing a hybrid engine model that incorporates both physics-based and empirical components, involves the application of some form sequential model building for the construction and specification of the empirical elements. This arises for the reason that sufficient engine data required to model the entire flight regime for a given engine/aircraft application is never available from one flight alone and may takes days or weeks to assemble.

Such a consideration is of particular import when constructing a hybrid gas turbine engine model consisting of both physics-based and empirically derived constituents. A typical architecture for such a hybrid model commonly used for the purpose of engine performance monitoring is depicted in FIGS. 1a and 1b.

With reference to FIG. 1a, there is illustrated a typical configuration wherein an empirical modeling process captures the difference, or deltas, between the physics-based engine model and the actual engine being monitored. The empirical element can take many forms including, but not limited to, Regression models, Auto-Regressive Moving Average (ARMA) models, Artificial Neural Network (ANN) models, and the like. The inclusion of an engine performance estimation process in this architecture is not essential to the present invention, but is included to depict a typical application for which this hybrid structure is particularly helpful.

When the empirical model is complete, the hybrid structure takes the general form shown in FIG. 1b. The combination of the empirical element and the physics based engine model provides a more faithful representation for the particular engine being monitored. This provides more meaningful residual information from which an engine performance change assessment can be performed since potential (physics based) model inaccuracies and shortcomings have been effectively removed by virtue of the empirical element.

The scenarios illustrated in FIGS. 1a-1b are typically be performed on-board in real-time during actual engine operation and flight. Referring to FIG. 1a, such performance necessitates the storage and retention of engine and flight input data over a series of flights until such a time that sufficient flight and engine regime data is collected to complete the empirical model. This imposes an unrealistic requirement in terms of storage capacity for an on-board system.

What is therefore needed is a method for modeling the performance of device such as an engine, preferably a gas turbine engine, that does not require the storage and retention of a large volume of data, such as engine and flight input data over a series of flights.

SUMMARY OF THE INVENTION

Accordingly, it is an object of the present invention to provide a method, and an apparatus for performing such method, for sequentially building a hybrid model.

In accordance with the present invention, a method for modeling engine operation comprises the steps of: 1. collecting a first plurality of sensory data, 2. partitioning a flight envelope into a plurality of sub-regions, 3. assigning the first plurality of sensory data into the plurality of sub-regions, 4. generating an empirical model of at least one of the plurality of sub-regions, 5. generating a statistical summary model for at least one of the plurality of sub-regions, 6. collecting an additional plurality of sensory data, 7. partitioning the second plurality of sensory data into the plurality of sub-regions, 8. generating a plurality of pseudo-data using the empirical model, and 9. concatenating the plurality of pseudo-data and the additional plurality of sensory data to generate an updated empirical model and an updated statistical summary model for at least one of the plurality of sub-regions.

In accordance with the present invention, a method for modeling engine operation comprises the steps of: collecting a first plurality of sensory data, partitioning a flight envelope into a plurality of sub-regions, assigning the first plurality of sensory data into the plurality of sub-regions, generating an empirical model of a portion of the plurality of sensory data, generating a statistical summary model for the portion of the plurality of sensory data, collecting an additional plurality of sensory data, generating a plurality of pseudo-data using the empirical model, and concatenating the plurality of pseudo-data and the additional plurality of sensory data to generate an updated empirical model and an updated statistical summary model for at least a portion of the sensory data.

In accordance with the present invention, an apparatus for modeling engine operation comprises an apparatus for collecting a first plurality of sensory data, an apparatus for partitioning the first plurality of sensory data into a plurality of sub-regions, an apparatus for generating an empirical model of at least one of the plurality of sub-regions, an apparatus for generating a statistical summary model for at least one of the plurality of sub-regions, an apparatus for collecting an additional plurality of sensory data, an apparatus for partitioning the second plurality of sensory data into the plurality of sub-regions, an apparatus for generating a plurality of pseudo-data using the empirical model, and an apparatus for concatenating the plurality of pseudo-data and the additional plurality of sensory data to generate an updated empirical model and an updated statistical summary model for at least one of the plurality of sub-regions.

In accordance with the present invention, a method of constructing an empirical model comprises the steps of 1. collecting a first plurality of sensory data, 2. partitioning an operating envelope into a plurality of sub-regions, 3. assigning the first plurality of sensory data into the plurality of sub-regions, 4. generating an empirical model of at least one of the plurality of sub-regions, 5. generating a statistical summary model for at least one of the plurality of sub-regions, 6. collecting an additional plurality of sensory data, 7. partitioning the second plurality of sensory data into the plurality of sub-regions, 8. generating a plurality of pseudo-data using the empirical model, and 9. concatenating the plurality of pseudo-data and the additional plurality of sensory data to generate an updated empirical model and an updated statistical summary model for at least one of the plurality of sub-regions.

DETAILED DESCRIPTION OF THE PREFERRED EMBODIMENT(S)

One possible embodiment of the present invention teaches a methodology for constructing the empirical model portion of a hybrid model, such as for an engine, in a sequential manner without the requirement for storing all of the original engine data previously collected and stored. The method involves sequentially developing and storing a compact statistical and parametric representation of the data, as it is collected, and generating representative pseudo-data samples from these models to be used in a piecewise model building process. As used herein, "pseudo-data" refers to a generated data set having the same statistical and inter-parameter dependencies as the original data set it is intended to mimic.

One consideration that must be addressed in the practical implementation of the hybrid model system described above is that measurement residuals are likely to vary with flight condition (e.g. mach and altitude) for the same engine power condition. As a result, the present invention teaches the partitioning of the flight envelope to allow individual empirical representations to be derived in lieu of using one empirical model for the entire flight regime.

Figure 2:
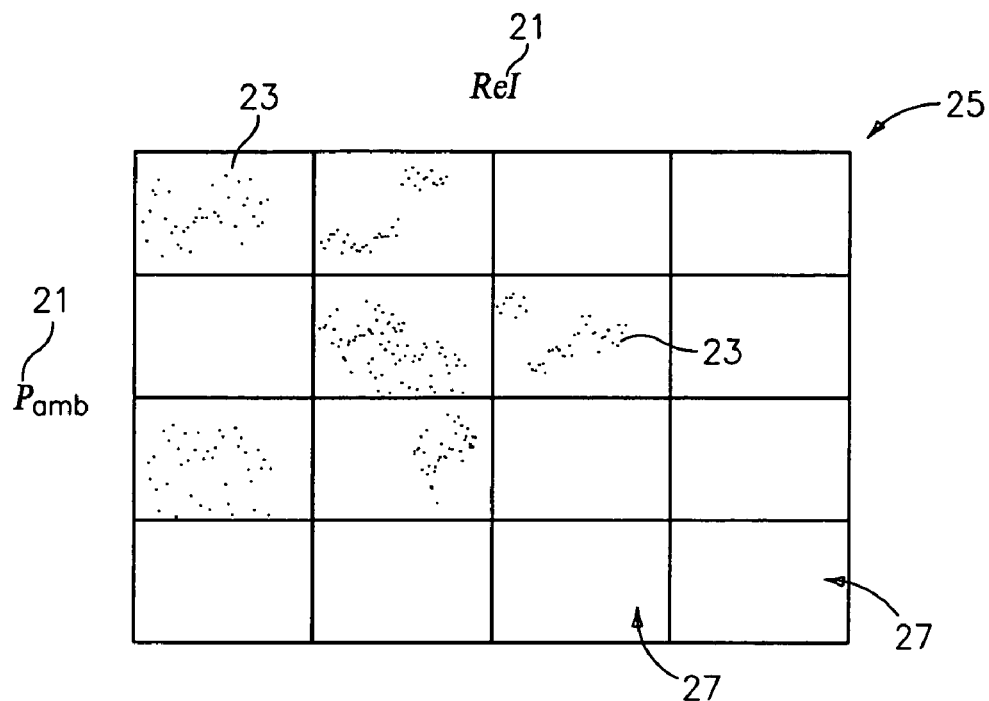
FIG. 2 A diagram of an exemplary flight regime partition of the present invention.

Thus, one possible method of performing the present invention supports an incremental approach to empirical modeling such that it does not expect that an engine will experience the entire flight regime in a single flight. In a preferred embodiment, the present invention partitions the flight envelope into sub-regions as a function of pertinent independent flight parameters. With reference to FIG. 2, there is illustrated an exemplary partition scheme wherein ambient pressure ($P_{amb}$) and Reynold's Index (ReI) are chosen as the defining parameters 21. In such a scenario, it is possible to effectively capture inlet temperature and pressure variations, altitude and mach number effects.

Individual points 23 represent where measurement data is available and residuals, representing the difference between the physics based model and the actual sensor measurements, are computed. Groupings of points obtained from measurements from a particular flight or a portion of a flight experiencing a well defined flight regime tend to form discrete clusters but can overlap with data recorded from other flight regimes. Over time, the grid 25 become more complete and the individual (regional) models can be built each corresponding to a discrete region 27. Each region 27 is represented by an individual empirical element that takes the form of, but is not limited to, a Multi-Level Perceptron Artificial Neural Network (MLP ANN) for each residual measurement under consideration. The evaluation of a partition model requires continuous interpolation between models of adjacent regions 27 so that the empirical estimates can be continuously generated as an engine traverses several flight regions 27 in real time.

The completed empirical model is formed by the concatenation of the individual sub-region models with an appropriate regime recognition logic controlling the sub-model evaluation and interpolation where required. An empirical model is considered complete when all previously or presently observed data reside in a sub-region that has been modeled.

The partitioning of the flight envelope contributes to the concept of sequential modeling in that it allows the construction of a predefined series of sub-models to represent the model space. Since the grid 25 is pre-defined (in order to limit the number of such sub-models), it is conceivable, and in fact likely, that insufficient data within a given grid element, or region 27, will be collected during a single flight to properly model the subspace. It should be clear that, no matter what particular modeling methodology is utilized, the entire set of data populating the grid 25 must be maintained for the proper modeling of a given sub-region 27. As noted, prior art methodologies for modeling and entire flight envelope would require the storage of the entire partitioned flight envelope resulting in the impractical storage of a large volume of data. While illustrated in exemplary fashion as formed of sixteen sub-regions 27, in practice, the grid 25 is not so limited.

The method of the present invention avoids the problem of storing prohibitive volumes of flight regime data by compressing the flight data in the form of statistical and correlative information at the conclusion of each (MLP ANN) training session. Then, after the next flight when new data is introduced (within a given sub-region) a set of pseudo-data is generated (with proper sample size) having the same statistical and inter-parameter dependencies as the original data. This pseudo-data is combined with the newly acquired data to form a new set upon which the next sequential model is obtained, after which, the concatenated data set is compressed as before awaiting the next iteration in this process.

One possible implementation to capture the statistical and parametric properties of the data collected during a given flight is a radial basis function (RBF) ANN, although other modeling functions could be used which is sufficient to provide a statistical and correlative model for each dependent measurement residual that captures the correlation of the parameter with the set of independent input commands driving the engine and engine models. The RBF ANN can be used to (re-generate) a statistically and parametrically consistent sample of pseudo-data.

Figure 6:
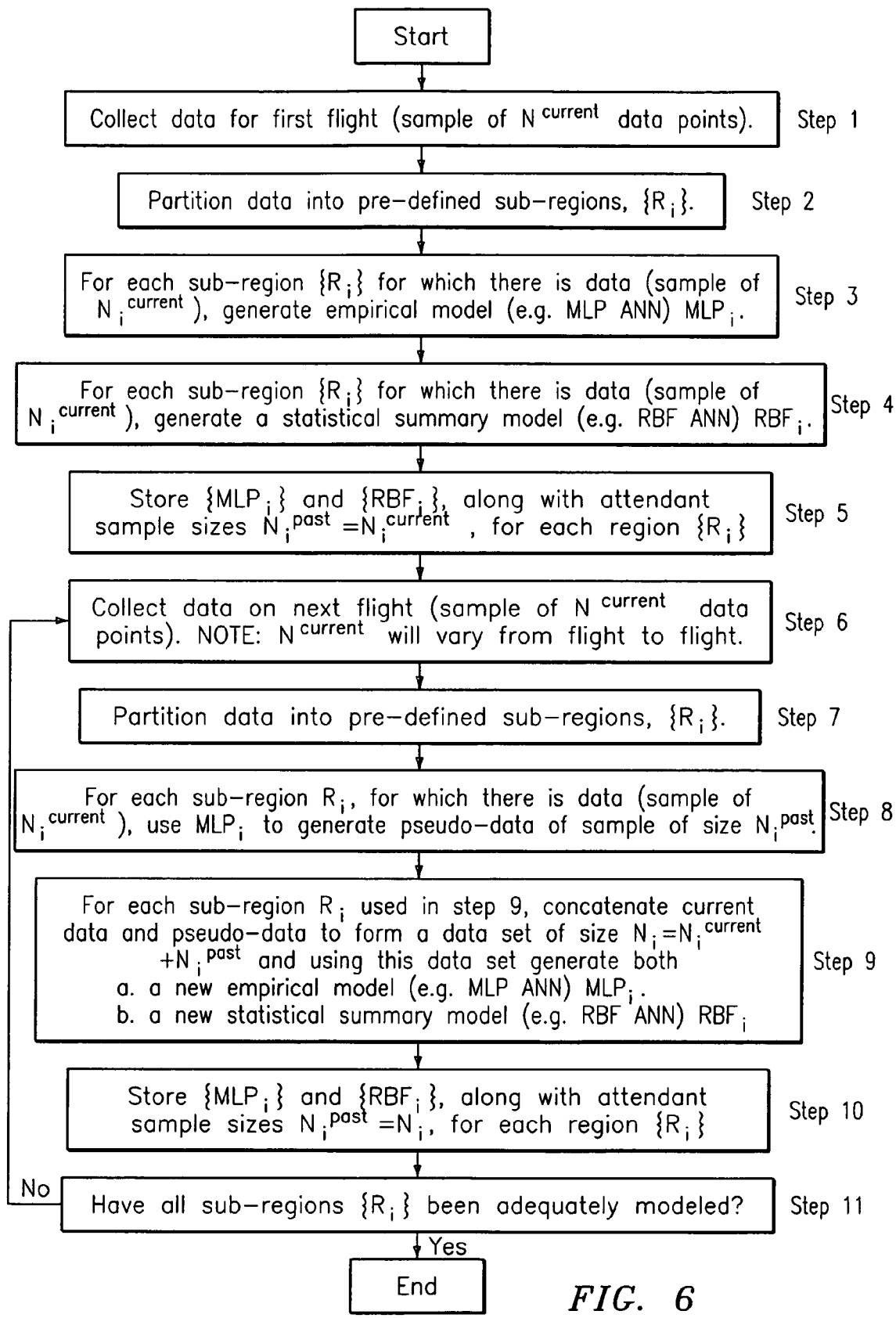
FIG. 6 Diagram of one possible method of performing the present invention.

The general process proceeds as follows as illustrated with reference to FIG. 6:

First, at step 1, data is collected for an initial flight forming a sample of $N^{current}$ data points. At step 2, the collected data is partitioned into pre-defined sub-regions, $\{R_i\}$. Then, at step 3, for each sub-region $\{R_i\}$ for which there is data (sample of $N_i^{current}$), an empirical model (e.g. MLP ANN) $MLP_i$ is generated. At step 4, for each sub-region $R_i$ for which there is data (sample of $N_i^{current}$), a statistical summary model (e.g. RBF ANN) $RBF_i$ is generated. Note that $$\sum_i N_i^{current} = N^{current}.$$

Then, at step 5, $\{MLP_i\}$ and $\{RBF_i\}$ are stored along with attendant sample sizes $N_i^{post}=N_i^{current}$, for each region $\{R_i\}$. At this point, at step 6, data is collected for a subsequent flight yielding a sample of $N^{current}$ data points. $N^{current}$ will vary from flight to flight. Then, at step 7, the flight data is partitioned into pre-defined sub-regions, $\{R_i\}$. Then, at step 8, for each sub-region $R_i$, for which there is data (sample of $N_i^{current}$, $MLP_i$ is used to generate pseudo-data of sample of size $N_i^{past}$. Next, at step 9, for each sub-region $R_i$ used in step 8, the current data and pseudo-data is concatenated to form a data set of size $N_i=N_i^{current}+N_i^{past}$ and this data set is used to generate both a new empirical model (e.g. MLP ANN) $MLP_i$, and a new statistical summary model (e.f. RBF ANN) $RBF_i$. At step 10, the generated $\{MLP_i\}$ and $\{RBF_i\}$ are stored, along with attendant sample sizes $N_i^{past}=N_i$, for each region $\{R_i\}$. Lastly, a determination is made as to whether all sub-regions $\{R_i\}$ have been adequately modeled. If all sub-regions $\{R_i\}$ have been adequately modeled, the process is terminated. If not, steps 7-10 are repeated until all sub-regions $\{R_i\}$ have been adequately modeled.

Figure 1A:
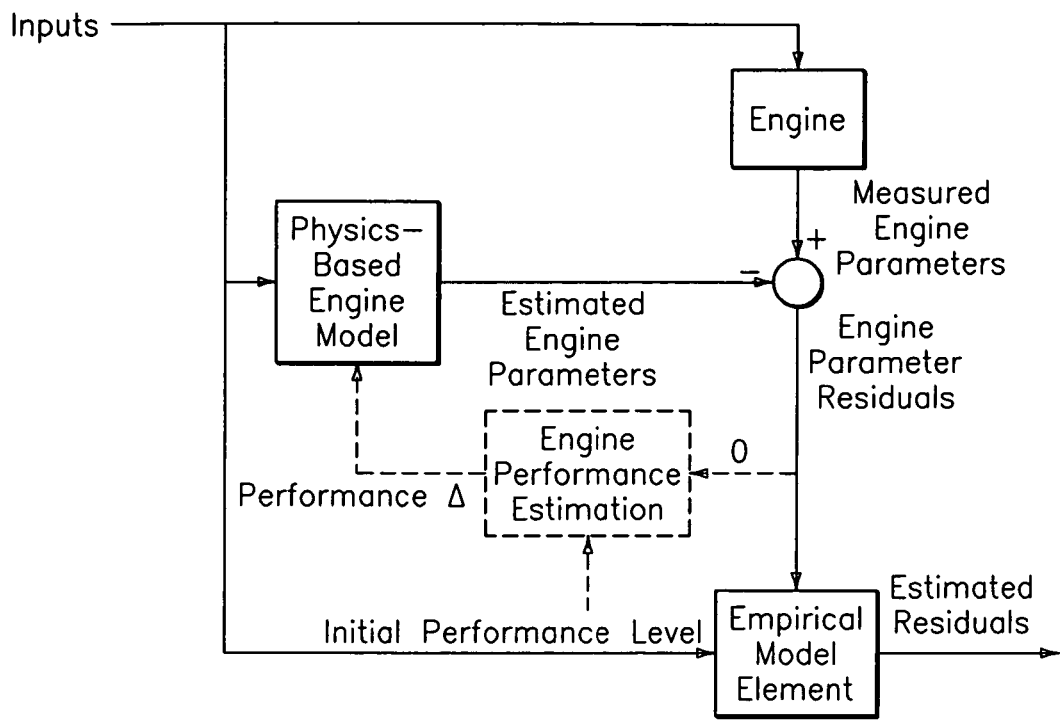
FIG. 1a A diagram of the architecture for constructing an empirical model element.
Figure 3:
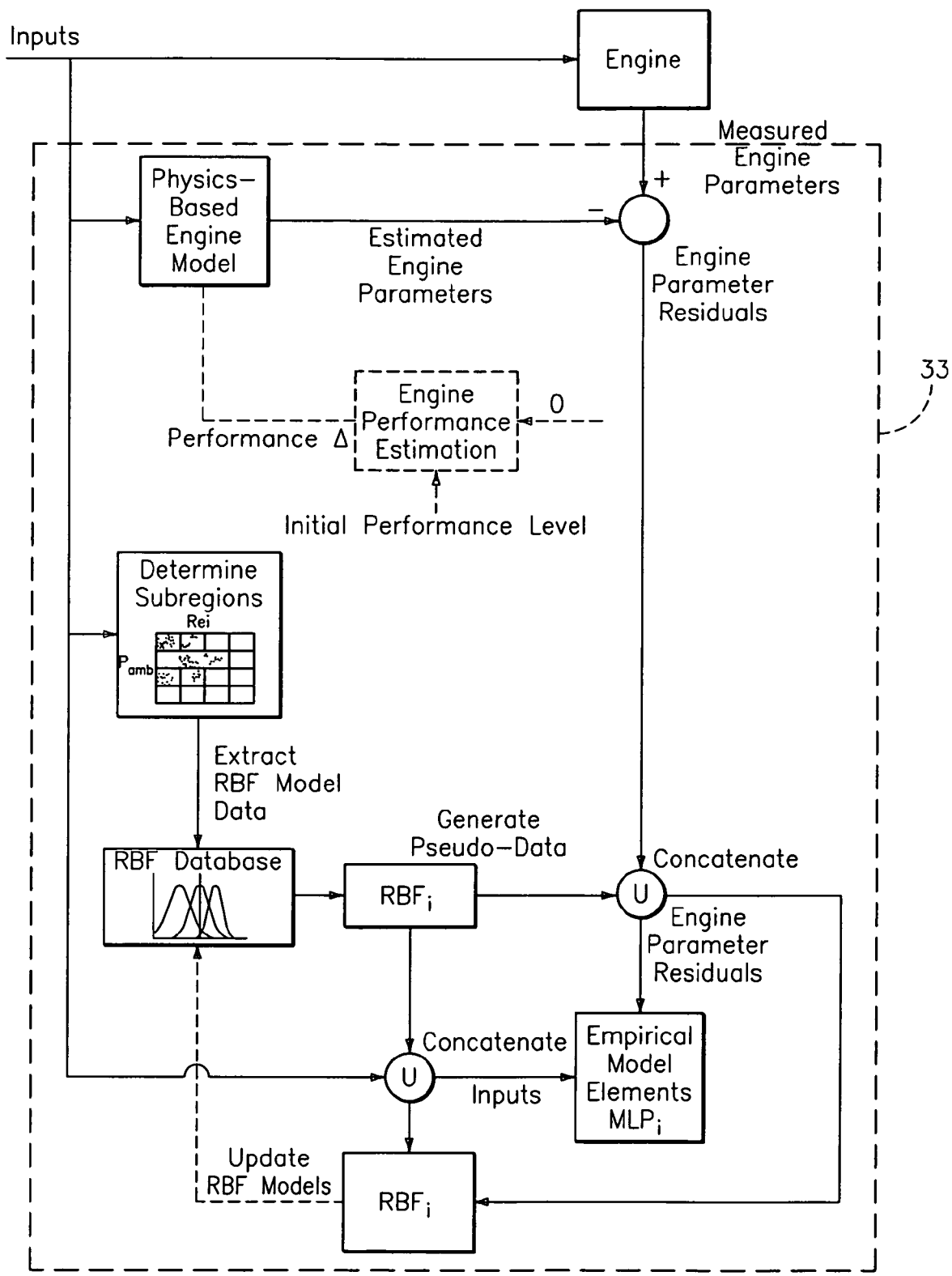
FIG. 3 A diagram of one embodiment of architecture for implementing empirical model construction using one possible method of performing the present invention.

A general architecture 33 supporting the above procedure is depicted in FIG. 3 and can be used to refine the architecture in FIG. 1a for developing the empirical model in a sequential manner using the bootstrap methodology. In a preferred embodiment, architecture 33 is formed of a general purpose computing device (not shown) adapted, through the implementation of hardware and software, to carry out the storage and retrieval of inputs, outputs, and intermediate computational results, as well as to perform computations upon data. For example, a computer, such as a personal computer or other such electronic computing device formed of a central processing unit and a data storage and retrieval device, may be used to provide a means for partitioning the sensory data into sub-regions, a means for generating an empirical model of at least one the sub-regions; a means for generating a statistical summary model for at least one of the sub-regions, a means for collecting additional sensory data, a means for partitioning the additional sensory data into the sub-regions, a means for generating pseudo-data using the empirical model, and a means for concatenating the pseudo-data and the additional sensory data to generate an updated empirical model and an updated statistical summary model for at least one of the sub-regions. In addition, any sensor, such as a thermometer or other sensory device adapted to sense an environment parameter may be utilized as a means for collecting the sensory data.

Figure 5:
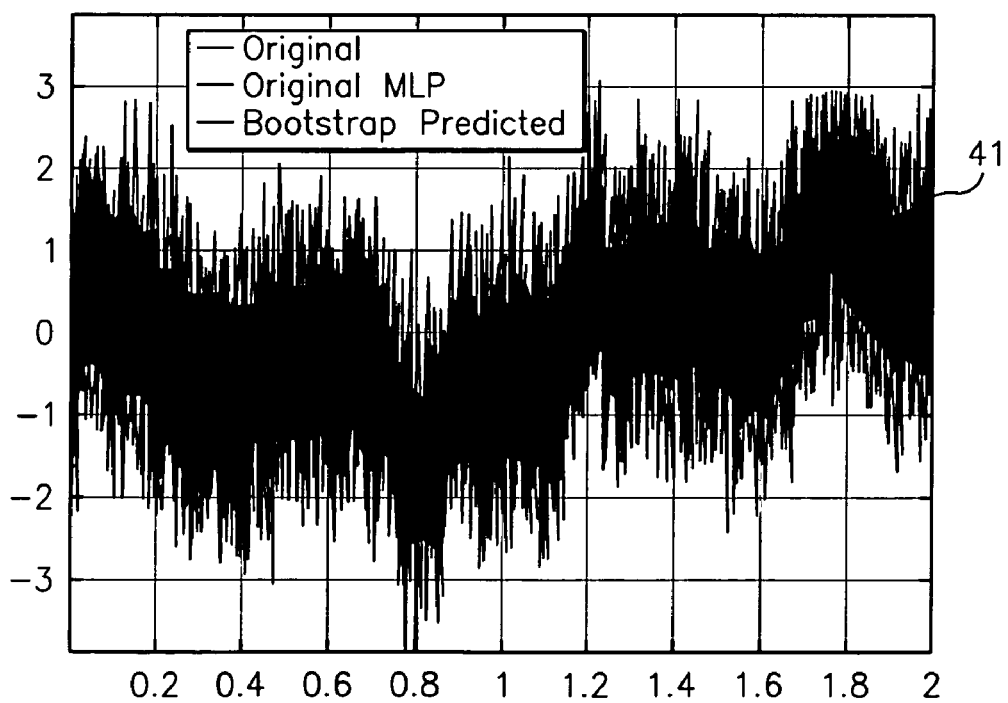
FIG. 5 Illustration of the difference between an original MLP and the Bootstrap MLP of the present invention.
Figure 4:
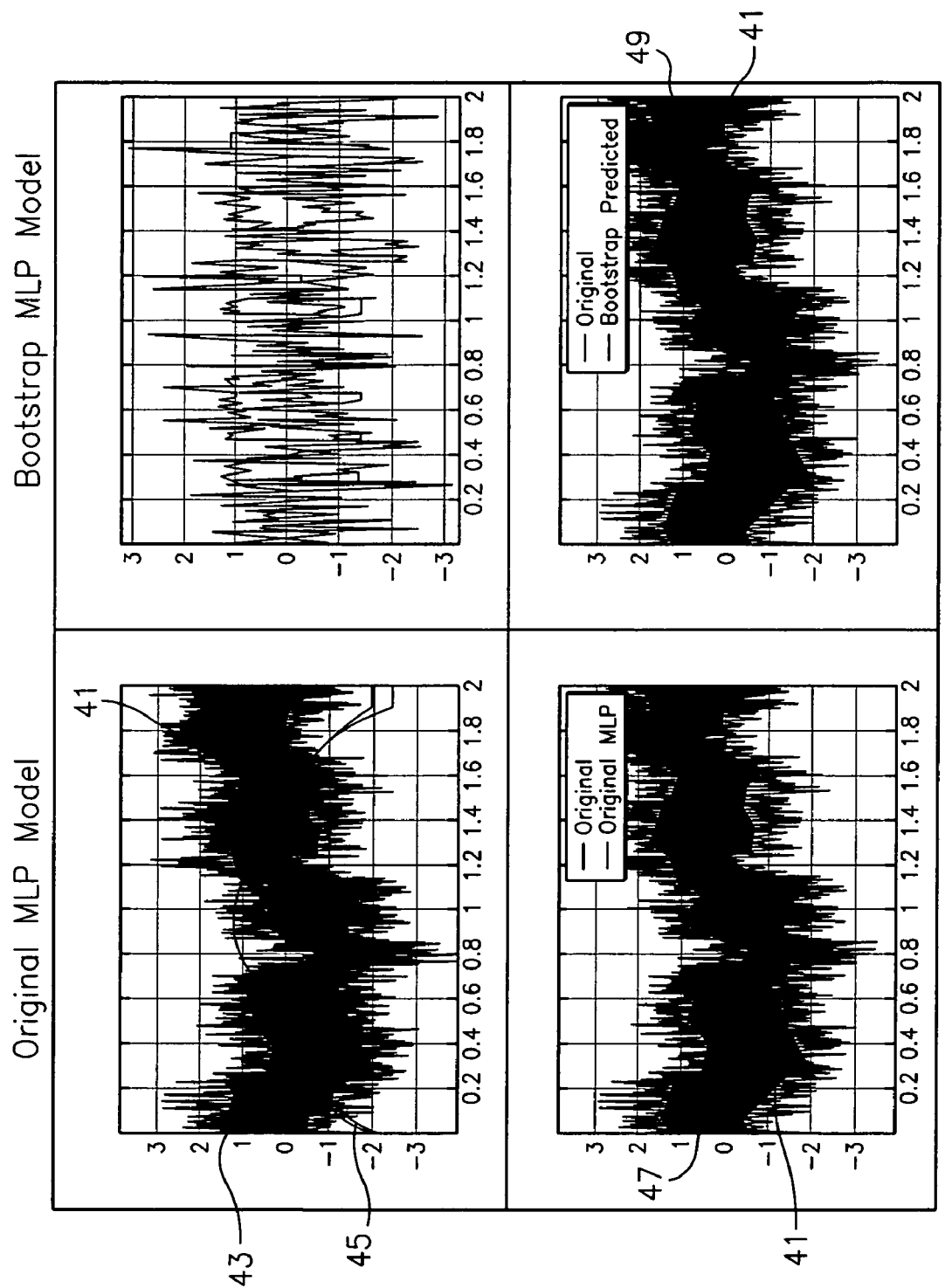
FIG. 4 Comparative illustration of residuals derived from an original multi-level perception (MLP) and the Bootstrap MLP of the present invention.

The process outlined above provides a foundation for an on-board implementation of the architecture presented in FIG. 3 for developing a hybrid engine model. To illustrate the efficacy of one possible method of performing the present invention, an empirical model using engine residual data was created and then re-created using bootstrap pseudo-data as outlined above. The salient features of this experiment are illustrated with reference to FIG. 4 below. The chart in the upper left hand corner contains the N1 residuals 41 between the engine and the physics-based engine model, as well as several of the input parameters driving the engine and model (e.g. low pressure compressor speed (N1) excursion from Idle to take-off to Idle (43), stator vane angle (SVA) (45), and various bleed commands, etc). The chart below it represents the original residuals and the MLP model of the residuals (47). The chart in the upper right represents bootstrap data (following the above procedure) for this same excursion. The scrambled appearance arises from the fact that there is no memory of time sequence for the data in the RBF representation that is used to manufacture the pseudo-data. It is as if we took the original data (left-hand chart) and permuted it. The chart in the lower right reflects the MLP modeling (49) accomplished using just the scrambled bootstrap data alone, superimposed on the original residual sequence (41). Comparing the two lower charts demonstrates the efficacy of the procedure. FIG. 5 depicts the original residual sequence (41), the original model MLP (47), and the bootstrap modeled MLP (49). The difference between the two MLPs 47, 49 is quite small.

This strategy of employing pseudo-data to incrementally build the hybrid portion (MLP) within each flight envelope partition works because the model does not explicitly use time as a modeling parameter. If one were to take the original residual (time) sequence and scramble it in any order, one would obtain the same empirical model MLP (assuming one uses the same (typically random) initial weights). The small difference between the original MLP 47 and the Bootstrap MLP 49 is caused by the statistical variability in the pseudo-data generation using the radial basis functions (RBFS) from the RBF model. The bootstrap data is statistically consistent with the original (time-sequenced) data, but of course, not identical. Repeating this process for the remaining gas path parameters, provides similar results.

Figure 1B:
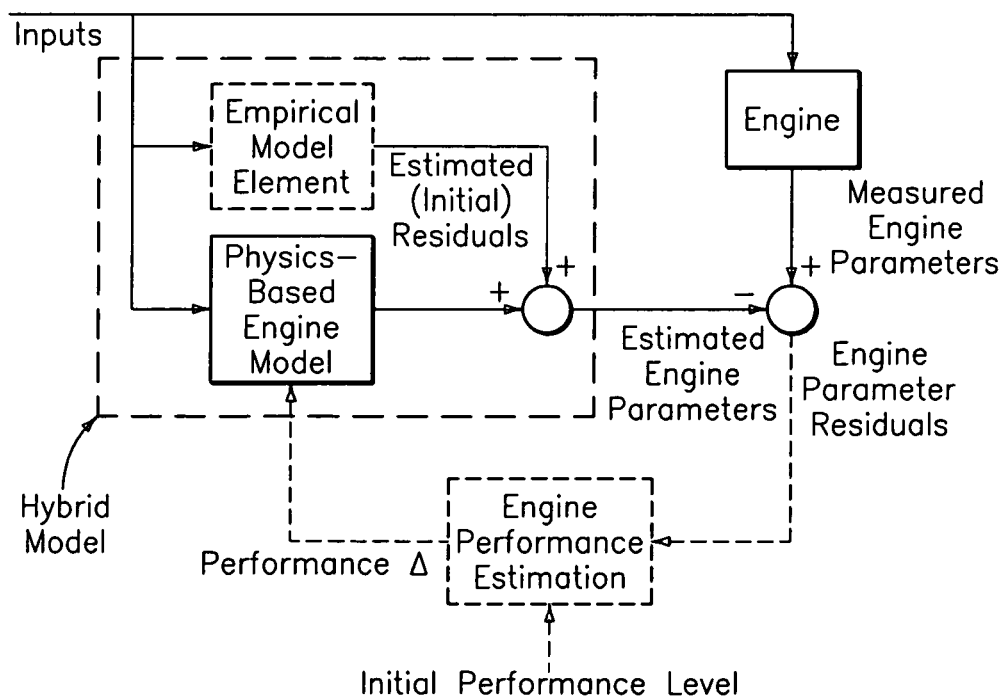
FIG. 1b A diagram of the architecture for hybrid engine model after construction is complete.

The effect (of using bootstrap data) on estimating module performance deltas as depicted in FIG. 1b is negligible. One is aided in practicing the present invention by the fact that one is modeling parameter residuals. The gas path parameters of the real engine, of course, have a time dependency, since this does represent a real physical process. Fortunately, the physics-based engine model also must share the same time dependency. The difference between the two, in effect, cancels the time dependency in the residuals.

It is apparent that there has been provided in accordance with the present invention a method for sequentially building a hybrid engine model which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method for modeling engine operation comprising the steps of:
    1. inputting a first plurality of sensory data from a gas turbine engine into a computer;
    2. partitioning a flight envelope into a plurality of sub-regions according to the steps of:
    3. selecting a first sensory parameter and a second sensory parameter,
    4. plotting each of said first plurality of sensory data by using said first sensory parameter as a first axis and said second sensory parameter as a second axis, and
    5. dividing said first axis and said second axis into a plurality of subdivisions to create a grid comprising a plurality of sub-regions;

6. assigning said first plurality of sensory data into said plurality of sub-regions;
7. generating an empirical model of at least one of said plurality of sub-regions;
8. generating a statistical summary model for at least one of said plurality of sub-regions;
9. inputting an additional plurality of sensory data from said gas turbine engine into said computer;
10. partitioning said second plurality of sensory data into said plurality of sub-regions;
11. generating a plurality of pseudo-data using said empirical model;
12. concatenating said plurality of pseudo-data and said additional plurality of sensory data; and
13. outputting using said computer an updated empirical model and an updated statistical summary model for at least one of said plurality of sub-regions.

2. The method of claim 1 comprising the additional step of repeating steps 8 through 11 until an updated empirical model and an updated statistical summary model is generated for each of said plurality of sub-regions.

3. The method of claim 1 wherein said selecting said first sensory parameter and said second sensory parameter comprises selecting ambient pressure and Reynold's Index.

4. The method of claim 1 wherein said generating said empirical model comprises generating a multi-level perceptron artificial neural network (MLP ANN).

5. The method of claim 1 wherein said generating said empirical model comprises concatenating a plurality of said empirical models each corresponding to one of said plurality of sub-regions.

6. The method of claim 1 wherein said generating said statistical summary model comprises generating a radial basis function (RBF) ANN.

7. The method of claim 1 wherein inputting said plurality of sensory data comprises collecting a plurality of residuals each formed from the difference between an engine measurement and an output of a physical model of said engine.

8. A method for modeling engine operation comprising the steps of: inputting a first plurality of sensory data from a gas turbine engine into a computer;
   partitioning a flight envelope into a plurality of sub-regions according to the steps of:
      selecting a first sensory parameter and a second sensory parameter,
      plotting each of said first plurality of sensory data by using said first sensory parameter as a first axis and said second sensory parameter as a second axis, and
      dividing said first axis and said second axis into a plurality of subdivisions to create a grid comprising a plurality of sub-regions;
   assigning said first plurality of sensory data into said plurality of sub-regions;
   generating an empirical model of a portion of said plurality of sensory data;
   generating a statistical summary model for said portion of said plurality of sensory data;
   inputting an additional plurality of sensory data from said gas turbine engine into said computer;
   generating a plurality of pseudo-data using said empirical model;
   concatenating said plurality of pseudo-data and said additional plurality of sensory data; and
   outputting using said computer an updated empirical model and an updated statistical summary model for at least a portion of said sensory data.

9. The method of claim 8 wherein said inputting said sensory data comprises collecting sensory data from a gas turbine engine.

10. The method of claim 8 wherein said generating said empirical model comprises generating a multi-level perceptron artificial neural network (MLP ANN).

11. The method of claim 8 wherein said generating said statistical summary model comprises generating a radial basis function (RBF) ANN.

12. The method of claim 1 wherein inputting said plurality of sensory data comprises collecting a plurality of residuals each formed from the difference between an engine measurement and an output of a physical model of said engine.

13. An apparatus for modeling engine operation comprising:
   means for inputting a first plurality of sensory data from a gas turbine engine into a computer;
   means for partitioning said first plurality of sensory data into a plurality of sub-regions, said means for partitioning comprising the following:
      means for selecting a first sensory parameter and a second sensory parameter,
      means for plotting each of said first plurality of sensory data by using said first sensory parameter as a first axis and said second sensory parameter as a second axis, and
      means for dividing said first axis and said second axis into a plurality of subdivisions to create a grid comprising a plurality of sub-regions;
   means for generating an empirical model of at least one of said plurality of sub-regions;
   means for generating a statistical summary model for at least one of said plurality of sub-regions;
   means for inputting an additional plurality of sensory data from said gas turbine engine into said computer;
   means for partitioning said second plurality of sensory data into said plurality of sub regions;
   means for generating a plurality of pseudo-data using said empirical model;
   means for concatenating said plurality of pseudo-data and said additional plurality of sensory data; and
   outputting using said computer an updated empirical model and an updated statistical summary model for at least one of said plurality of sub-regions.

14. A method of constructing an empirical model, comprising the steps of:
1. inputting a first plurality of sensory data from a gas turbine engine into a computer;
2. partitioning an operating envelope into a plurality of sub-regions according to the steps of:
3. selecting a first sensory parameter and a second sensory parameter,
4. plotting each of said first plurality of sensory data by using said first sensory parameter as a first axis and said second sensory parameter as a second axis, and
5. dividing said first axis and said second axis into a plurality of subdivisions to create a grid comprising a plurality of sub-regions;
6. assigning said first plurality of sensory data into said plurality of sub-regions;
7. generating an empirical model of at least one of said plurality of sub-regions;
8. generating a statistical summary model for at least one of said plurality of sub-regions;
9. inputting an additional plurality of sensory data from said gas turbine engine into said computer;

10. partitioning said second plurality of sensory data into said plurality of sub-regions;
11. generating a plurality of pseudo-data using said empirical model;
12. concatenating said plurality of pseudo-data and said additional plurality of sensory data; and
13. outputting using a computer an updated empirical model and an updated statistical summary model for at least one of said plurality of sub-regions.

* * * * *